April 26, 1966 R. J. BLAZEK ETAL 3,248,588
ELECTROLUMINESCENT DEVICE WITH INTEGRAL COLOR MODIFIER
Filed March 22, 1963 3 Sheets-Sheet 1

INVENTORS
ROBERT J. BLAZEK &
HENRY SKWIRUT.
BY
D. S. Buleza
AGENT.

April 26, 1966  R. J. BLAZEK ETAL  3,248,588
ELECTROLUMINESCENT DEVICE WITH INTEGRAL COLOR MODIFIER
Filed March 22, 1963  3 Sheets-Sheet 2

INVENTORS.
ROBERT J. BLAZEK &
HENRY SKWIRUT.
BY
D. S. Buleza
AGENT.

April 26, 1966     R. J. BLAZEK ETAL     3,248,588
ELECTROLUMINESCENT DEVICE WITH INTEGRAL COLOR MODIFIER
Filed March 22, 1963     3 Sheets-Sheet 3

INVENTORS.
ROBERT J. BLAZEK &
HENRY SKWIRUT.
BY
AGENT.

United States Patent Office
3,248,588
Patented Apr. 26, 1966

3,248,588
ELECTROLUMINESCENT DEVICE WITH INTEGRAL COLOR MODIFIER
Robert J. Blazek, Mendham, and Henry Skwirut, Verona, N.J., assignors to Westinghouse Electric Corporation, Pittsburgh, Pa., a corporation of Pennsylvania
Filed Mar. 22, 1963, Ser. No. 267,094
7 Claims. (Cl. 313—108)

This invention relates to electroluminescent devices and has specific reference to an electroluminescent lamp having an integral modifier that changes the color of the light generated by the electroluminescent phosphor.

Despite the rapid advances being made in the electroluminescent art, there is still not available an electroluminescent phosphor that will efficiently produce red radiations of the purity or hue desired for instrument lighting and other applications. In addition, and of equal importance, the absence of such a good red-emitting electroluminescent phosphor makes it very difficult to make an electroluminescent light source that has a true or "color-balanced" white emission. While white-emitting electroluminescent lamps can be made by mixing presently available phosphors, their efficiency is quite low. In addition, since the outputs of the phosphors decrease at different rates with time, the color of the light varies during the life of the lamp depending upon which of the mixed phosphors experiences the greatest drop in output.

Recognizing the aforesaid deficiency of phosphor blends, others in the art have made acceptable red and white-emitting cells by incorporating a fluorescent or photoluminescent material into the cell structure which material is excited by and converts a preselected portion of the electroluminescent emission into longer wavelength radiations. However, in the prior art "cascade-excitation" devices of this type the luminescent material was present either in the form of an overlay or finely-divided particles or a liquid that was mechanically mixed with an hence unevenly distributed in the dielectric matrix in which the electroluminescent phosphor is embedded. The conversion efficiency of the fluorescent material, and thus the overall efficiency of the lamp, was quite low. In addition, the resulting heterogeneous distribution of the luminescent material produced variations in the color and brightness of the light emitted by the lamp which detracted from its appearance and usefulness.

It is, accordingly, the general object of the present invention to overcome the foregoing and other deficiencies in the prior art devices by providing a "cascade" type electroluminescent lamp that will efficiently and uniformly produce either red or white light of the desired hue, is inexpensive to make, and displays good color stability throughout its useful life.

The foregoing objects, and other advantages that will become apparent to those skilled in the art, are achieved in accordance with the present invention by utilizing as the luminescent material a selected organic dye that
 (1) exhibits daylight fluorescence
 (2) is disposed in intimate contact with the electroluminescent phosphor particles, and
 (3) is homogeneously distributed therewith throughout the plastic dielectric layer.

The intimate association of the dye and phosphor particles and their uniform distribution throughout the dielectric layer is achieved by dissolving a pigment containing the fluorescent dye in a selected solvent which also solubilizes the plastic resin used as the dielectric matrix. The electroluminescent phosphor particles are added to the resulting lacquer which is then stirred until it becomes homogenized. This phosphor-impregnated and dyed solution is then deposited on the cell substrate and cured in the normal manner to produce the finished lamp.

A high-impedance layer of clear plastic containing dissolved daylight-fluorescent dye of the same type, or a predetermined amount of barium titanate, or both, can also be included in the lamp structure adjacent one of the electrodes to further increase the brightness and uniformity of the emitted light.

A better understanding of the invention will be obtained by referring to the accompanying drawings, wherein.

EMBODIMENT I

Figure 1:
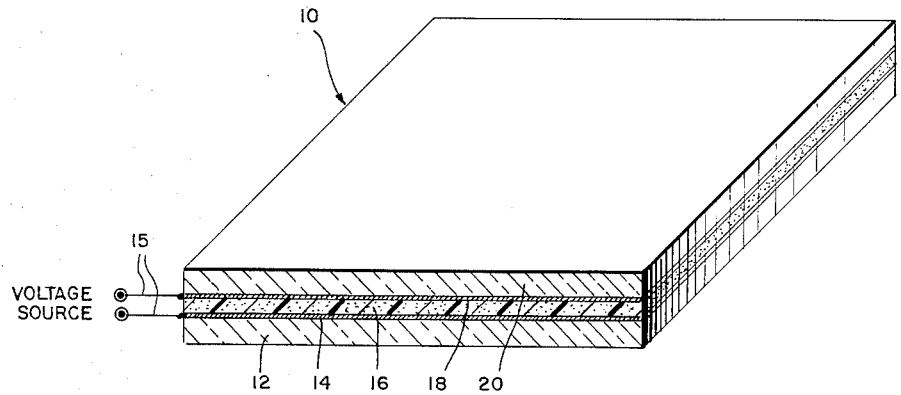
FIGURE 1 is an enlarged perspective view of one form of "cascade" electroluminescent lamp embodying the invention, wherein the dissolved daylight-fluorescent dye is included in the plastic dielectric layer along with the electroluminescent phosphor particles.

With particular reference to the drawings, in FIG. 1 there is shown one form of the invention comprising an electroluminescent lamp 10 having a base member 12, such as a glass plate, that is coated with a thin film of tin oxide or the like that serves as a light-transmitting electrode 14. A dielectric layer 16 of a suitable light-transmitting plastic is disposed over the light-transmitting electrode 14 and is impregnated with finely-divided electroluminescent phosphor and a selected organic daylight-fluorescent dye. A second light-transmitting electrode 18 covers the dielectric layer and is, in turn, covered by a protective layer 20 of a suitable glass or plastic. The electrodes 14 and 18 are connected to a power source by means of conductors 15.

The particular embodiment illustrated in FIG. 1 can, accordingly, be of "all-plastic" or of "glass-plastic" construction depending upon whether or not the base member 12 and protective layer 20 are made of plastic or glass. Since both of the electrodes are light-transmitting, the lamp 10 will emit light from both of its faces.

Optimum efficiency, brightness, uniformity and color stability are achieved in accordance with the present invention by using (1) a plastic dielectric that is soluble in the same solvent as the daylight-fluorescent dye, and (2) a dye that has an absorption and emission spectra such that it selectively converts a portion or substantially all of the electroluminescent radiations into red radiation of a hue which it reflects. As a specific example of a suitable combination of materials, excellent results have been obtained by using cyanoethylated cellulose or cyanoethylated polyvinyl alcohol (CEPVA) as the plastic dielectric matrix, "Rocket Red A–13" pigment as the daylight-fluorescent dye, and either N,N-dimethyl formamide (hereinafter referred to as DMF) or acetonitrile, or mixtures thereof, as the solvent or solubilizing vehicle.

Cyanoethylated cellulose is a well-known material available commercially as HD Resin–27 from the Hercules Powder Company, Wilmington, Delaware, and may be of the unsubstituted type or substituted, for example, cyanoethylated ethyl or methyl cellulose.

"Rocket Red A–13" pigment is a red-emitting daylight-fluorescent material marketed by the Switzer Brothers, Inc., Cleveland, Ohio. This pigment comprises a powdered thermoplastic melamine-sulfonamide-formaldehyde resin which contains a dissolved organic daylight-fluorescent dye or dye stuff that has the peculiar property of transforming absorbed light of a shorter wavelength into red light of the same hue as that which it reflects. The reflected color is, accordingly, amplified or reinforced by the emitted color with the result that a very pure and bright color effect is produced when the pigment is exposed to daylight. Such dye pigments are well known and are described in detail in U.S. Patents Nos. 2,498,592, 2,653,109, 2,809,954, 2,851,424, and 2,938,873. The characteristics and physical properties of "Rocket Red A–13" pigment are described in Technical Bulletin No. 1115–A published by the Switzer Brothers, Inc.

It should be noted that the solvent must be capable of solubilizing both the daylight-fluorescent dye or pigment and also the plastic dielectric resin, and the latter must also be compatible with the dye itself. Thus, the selection of the materials is very critical and the proper combination must be used if depreciation of the phosphor and dye is to be avoided and a uniform distribution of the phosphor particles and fluorescent dye throughout the plastic dielectric in the lamp is to be obtained. When the aforementioned materials are used and properly mixed both the daylight-fluorescent dye and the electroluminescent phosphor particles are in intimate contact with each other and are uniformly distributed throughout the plastic dielectric. Thus, the conversion of preselected wavelengths of electroluminescent radiations can be efficiently achieved by relatively small quantities of dye and the light produced by the lamp will have the desired color and uniformity.

The intimate physical relationship and uniform distribution of the phosphor particles and fluorescent dye are important inasmuch as the phosphor particles function as an internal scattering agent which prevents the red emission produced by the dye from being propagated to the edges of the cell and lost. Thus, the aforesaid intimate contact and uniform distribution of these two components is essential if the light is to be emitted uniformly from the face of the lamp and converted with maximum efficiency.

While any electroluminescent phosphor that emits in the green or yellow-blue region of the spectrum may be used, superior results have been obtained by using a yellow-green emitting zinc-cadmium sulfide phosphor that is activated by copper and coactivated by bromine. This phosphor displays excellent maintenance characteristics and may be prepared by mixing zinc and cadmium sulfides in the molar ratio of 0.9 ZnS–0.1 CdS with copper in compound form, such as the acetate, in the amount of 0.5 to 1 gram-atom percent per gram mole of sulfide, and 0.3 to 0.5 gram-atom percent of bromine, added as ammonium bromide for example, per gram mole of sulfide. For best performance, the phosphor raw mix is fired and cooled in a sulfur vapor atmosphere, as disclosed in copending application of Willi Lehmann, Serial No. 259,615, filed February 19, 1963, and owned by the present assignee.

Figure 3:
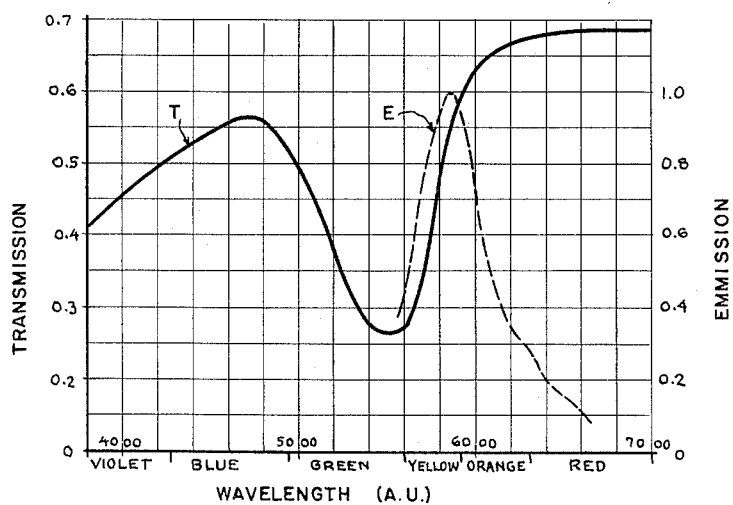
FIG. 3 is a graph illustrating the absorption and emission spectra of a preferred red daylight-fluorescent dye utilized in accordance with the invention.

The aforementioned "Rocket Red A–13" daylight-fluorescent dye or pigment has an absorption and emission spectra such that both white and red emitting cells of good hue, brightness and color stability can readily be obtained. As shown in FIG. 3, this particular pigment strongly absorbs radiations in the green-yellow region of the spectrum and emits in the yellow to red region. This is evident from the transmission curve T which peaks in the blue and orange-red regions and is at a minimum in the yellow-green region, and by the emission curve E which rapidly rises to the peak in the yellow-orange region and trails off gradually into the red region of the spectrum.

The transmission curve T indicates that absorption is at a maximum at about 5550 A.U. (green-yellow region), decreases to a minimum at about 4700 A.U. (blue region) and then increases again for shorter wavelengths. Very little absorption occurs in the region above about 6300 A.U. (red region). The emission (curve E) for this particular sample of red dye reaches a peak at about 5850 A.U. (yellow-orange) and exhibits additional emission bands in the neighborhood of 6250 and 6550 A.U. (red region).

This dye is unique in that its absorption is quite high in the region of its main emission peak around 5800 A.U. Thus, it reabsorbs some of its own emission with the result that its emission shifts to progressively longer wavelengths as the concentration of the dye is increased. Due to this reabsorption characteristic and the overlapping of the absorption and emission spectra, the emission curve decreases extremely rapidly on the short wavelength side. This makes it possible to obtain deep red radiations without the emission peak of the electroluminescent phosphor being at extremely long wavelengths, as is the case with normal phosphor emission curves due to their short-wavelength tail. Thus, in order to achieve red emission of equivalent hue and chroma with normal copper-activated sulfide phosphors the emission peak must be at about 7000 A.U. and the luminous efficiency is, therefore, quite low.

The conversion efficiency of the daylight-fluorescent dye is also enhanced by the fact that the dye is apparently better excited by its own emission than by the green output of the electroluminescent phosphor. Thus, deep shades of red and color-balanced white light can be achieved using this dye by properly controlling its concentration and selecting a phosphor having the proper emission.

FABRICATION

Following are several specific examples of suitable formulations for making white-emitting lamps according to the invention.

*Example I.*—38.1 parts of DMF is first added to 100 parts by volume of acetonitrile to form a solvent. One gram of "Rocket Red A–13" fluorescent dye is then dissolved in 40 ml. of the solvent. This is added to 55 ml. of a 10% solution of HD Resin–27 in the same type of solvent to form a lacquer. About 15 gms. of finely-divided electroluminescent phosphor is then added to the lacquer and the resulting mixture is stirred until it is homogenized. The homogenized formulation is then spray coated onto the electrically conductive glass substrate of the electroluminescent cell in the usual manner so that an homogenized dielectric layer that is uniformly impregnated with phosphor particles and dissolved daylight-fluorescent dye and about 2.5 mils thick is formed. Curing of the phosphor-dye-impregnated plastic dielectric layer is then effected by baking for about 10 minutes at about 150° C.

*Example II.*—One gram of "Rocket Red A–13" pigment and 16 gms. of (Zn,Cd)S:Cu,Br electroluminescent phosphor are added to 106.3 ml of a 6% solution of HD Resin–27 in a solvent consisting of acetonitrile and DMF in a weight ratio of 2.2 to 1. The resulting composition is stirred until homogenized and coated onto the substrate as described in Example I above.

PERFORMANCE

Lamps made in accordance with Examples I and II above exhibited white emission brightnesses as high as 80% of the brightness exhibited by green-emitting electroluminescent lamps without any dye or pigment incorporated therein. In general, the white-emitting lamps were at least 70 to 75% as bright as green-emitting lamps of the same construction and maintained this high efficiency throughout a wide range of operating voltages and frequencies.

Lamps made with standard ZnS:Cu,Br phosphor, HD Resin–27 dielectric and "Rocket Red A–13" daylight-fluorescent pigment operated at 71% efficiency and had a brightness of 68 foot lamberts and a color temperature of about 2470° K. with 468 volt, 420 c.p.s. excitation. The visual appearance of the white emission obtained from this lamp was very similar to the light radiated by an incandescent lamp provided with a translucent filter.

Figure 4:
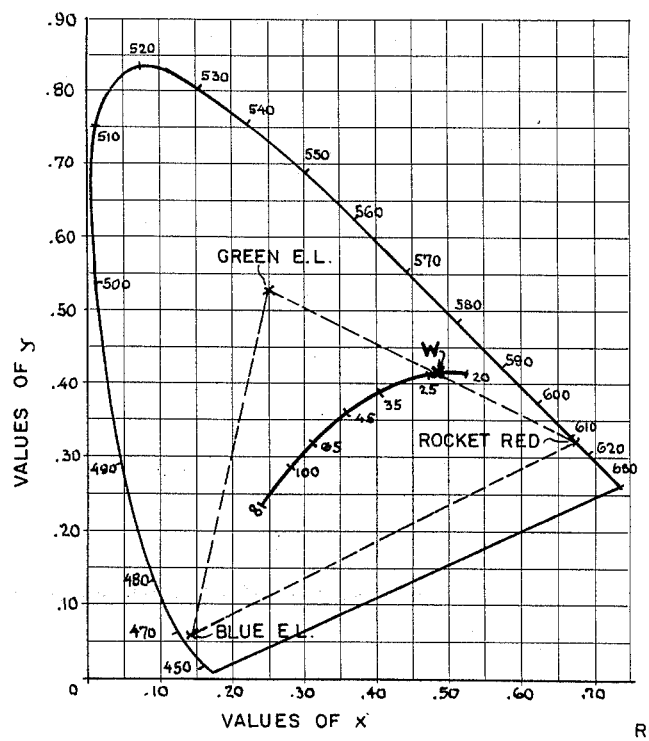
FIG. 4 is a C.I.E. chromaticity diagram illustrating the spectral emission of a white-emitting lamp which includes a blue-green emitting electroluminescent phosphor and the aforesaid red-emitting dye.

The aforementioned white emission corresponds to point W on the Planckian locus of the C.I.E. chromaticity diagram shown in FIG. 4. As indicated in this diagram, the selected conversion of preselected amounts of the green-blue and yellow emissions of standard electroluminescent phosphors by the "Rocket Red" daylight-fluorescent dye or a similar dye stuff enables white-emitting electroluminescent lamps to be obtained having a color temperature of at least about 2400° K. Moreover, this balanced-white emission is produced with higher efficiencies than can be obtained with similar "internal cascade" devices wherein the photoluminescent material is not dissolved in the plastic dielectric nor intimately associated with the electroluminescent phosphor particles in accordance with the principles of the present invention.

Figure 5:
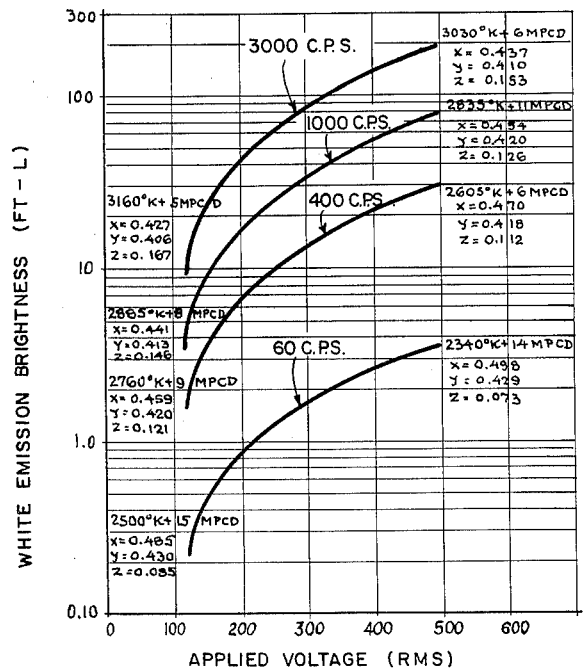
FIG. 5 is a graph showing the brightnesses and color temperatures of a white-emitting lamp when operated at various voltages and frequencies; and, FIG. 6 is a graph illustrating the improved lumen maintenance, color stability and life displayed by the aforesaid lamp.
Figure 6:
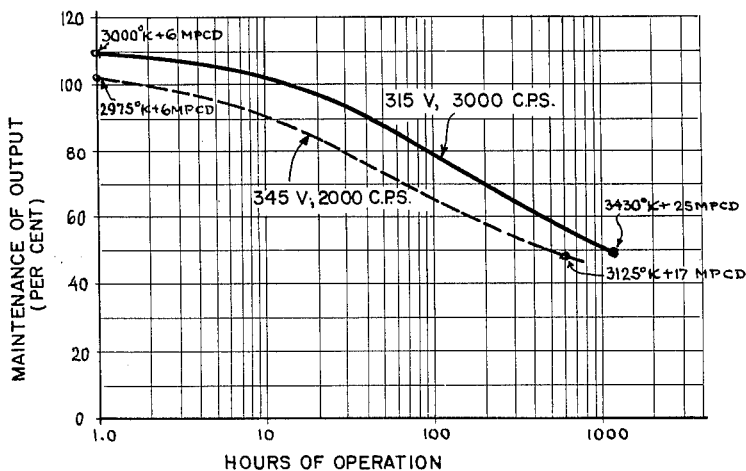

A lamp similar to the one described above produced a brilliant white emission with 502 foot lambert brightness and 72% efficiency when operated at 600 volts and 3 kc. Similar structures made with the "long maintenance" type (Zn,Cd)S:Cu,Br phosphor referred to above exhibited white light having color temperatures well above 2400° K. and brightnesses of 70 to 100 foot lamberts when operated at elevated voltages and frequencies, as shown in FIG. 5. In addition, these lamps had half-lives in the order of about 1000 hours, as shown in FIG. 6, even under such severe operating conditions. Similar lamps made with the well-known chlorine activated type phosphors produced good quality cool white emission with 2.6 foot lambert brightness when operated at 120 volts, 60 c.p.s.

EMBODIMENT II

Figure 2:
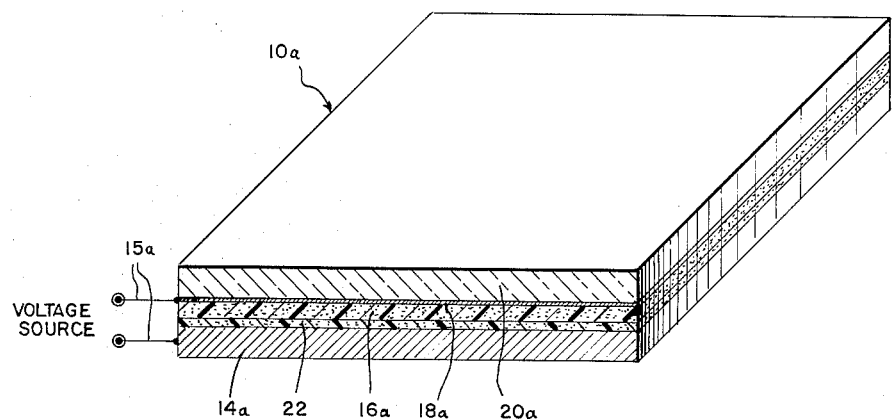
FIG. 2 is a similar view of an alternative lamp embodiment wherein a high-impedance plastic layer is provided between the phosphor-dye-containing dielectric layer and the opaque electrode.

As shown in FIG. 2, the lamp structure can be modified to further increase the brightness level by incorporating a high impedance layer between one of the electrodes and the phosphor-dye-impregnated dielectric layer. Such a modified lamp 10a comprises an opaque base electrode 14a made of aluminum or the like, a high impedance layer 22 of a suitable clear plastic, a dye-containing phosphor-dielectric layer 16a, a light-transmitting electrode 18a, and a protective cover coat 20a, superimposed in the order named. The lamp 10a is energized by means of leads 15a that connect with the light-transmitting electrode 18a and the base electrode 14a. A detailed discussion of the manner in which such impedance layers enhances both the brightness and maintenance performance of electroluminescent lamps is set forth in an article entitled "High Brightness Electroluminescent Lamps of Improved Maintenance," published in Illuminating Engineering, September 1962.

The high impedance layer 22 can comprise either a clear coat of the same plastic as that used as the dielectric matrix, or one which contains a preselected amount of barium titanate, or one which contains both barium titanate and a solvated daylight-fluorescent dye of the same type as that dissolved in the phosphor-dielectric layer.

As a specific example of a clear high-impedance layer, 31 ml. of a 10% solution of HD Resin–27 in a solvent comprising 38.1 parts DMF and 100 parts of acetonitrile by volume, is mixed with 44 ml. of the same solvent and ½ gram of "Rocket Red A–13" daylight-fluorescent pigment. The resulting composition is homogenized, deposited on the base electrode 14a to form a layer approximately 0.5 to 0.6 mils thick, and the layer cured in the usual manner.

The brightness of the lamp 10a can be further enhanced by providing a white reflecting background for the dye-phosphor-impregnated dielectric layer 16a. This can be achieved by incorporating about 70% $BaTiO_3$ in the high impedance layer. As a specific example, 40 ml. of 10% solution of HR Resin–27 in 38.1 parts DMF and 100 parts acetonitrile by volume is admixed with 8 grams of $BaTiO_3$ and 0.6 gram of "Rocket Red A–13" pigment, and the mixture added to 50 ml. of a thinner comprising DMF and acetonitrile in the aforesaid proportions. The resulting composition is then homogenized and deposited to form the high-impedance layer in the usual manner.

By properly adjusting the amount of the daylight-fluorescent dye used it will be apparent that proportionately larger portions of the electroluminescent emission can be converted into red radiation. By using a sufficiently high concentration of the red dye and a strong green-emitting electroluminescent phosphor, substantially all of the green emission can be converted into red radiation to provide a red-emitter lamp that not only produces a deep rich red color but which is brighter and more efficient than the prior art devices utilizing non-dissolved photoluminescent materials.

It will be appreciated from the foregoing that the objects of the invention have been achieved by providing a means for efficiently converting a preselected portion of the output of an electroluminescent device to red radiations and thereby producing white or red light of improved brightness, color stability, uniformity and hue.

While several embodiments have been described in detail, it will be appreciated that various changes in the structure of and materials used in the device can be made without departing from the spirit and scope of the invention. For example, either DMF or acetonitrile alone can be used as the solvent for the dielectric plastic and daylight-fluorescent dye. Since the boiling point of acetonitrile is about 73 to 77° C. and that of DMF about 152 to 154° C., DMF will not evaporate as fast and is thus suitable for use in making compositions that can be cast onto the cell substrate. Acetonitrile, on the other hand, can be used when deposition by the "knife coating" technique is employed.

In addition, other red-emitting daylight-fluorescent dye pigments having properties similar to those of "Rocket Red A–13" can also be used, as for example pigments commercially available as "Velva-Glo" No. 3705, R–203 Red, and "Hi-Viz" No. B–3534, Red.

We claim as our invention:

1. In an electroluminescent device having a pair of spaced electrodes, means adapted to emit light when a voltage is applied across said electrodes comprising, in combination, a layer of plastic dielectric material disposed between said electrodes, a finely-divided electroluminescent phosphor that is dispersed in said layer of dielectric material and emits radiation mainly in the yellow-blue portion of the spectrum, and a daylight-fluorescent dye that comprises an integral solvated constituent of said plastic dielectric layer and is homogeneously distributed therein in intimate contact with the electroluminescent phosphor particles, said dye comprising an organic material that (a) is strongly excited by the yellow-green radiation generated by said electroluminescent phosphor and emits yellow-red radiation, (b) is also excited by its own yellow-orange emission which it converts into orange-red radiation, and (c) reflects red radiation of the same hue as that which it emits and thereby efficiently transforms a portion of the electroluminescent radiation to red radiation which blends with the other electroluminescent radiations and uniformly modifies the color of the light normally produced by said device.

2. The combination set forth in claim 1 wherein the concentration of the dye in said layer of plastic dielectric material is such that substantially all of the yellow-green electroluminescent radiation is converted into red radiation and the device emits red light.

3. The combination set forth in claim 1 wherein the concentration of the dye in said layer of plastic dielectric material is such that the device emits white light.

4. The combination set forth in claim 1 wherein said daylight-fluorescent dye and plastic dielectric material are both soluble in a material selected from the group consisting of N, N-dimethyl formamide, acetonitrile, and mixtures thereof.

5. In an electroluminescent lamp having a pair of spaced electrodes, means adapted to emit light when a voltage is applied across said electrodes comprising, in combination,
   a layer of plastic dielectric material disposed between said electrodes,
   a finely-divided electroluminescent phosphor that is dispersed in said layer of dielectric material and emits radiation mainly in the yellow-blue portion of the spectrum,
   a daylight-fluorescent dye that comprises an integral solvated constituent of said plastic dielectric material and is homogeneously distributed therein in intimate contact with the electroluminescent phosphor particles, and
   an impedance layer of plastic dielectric material that contains a dissolved daylight-fluorescent dye of the same type as that present in the phosphor-dielectric layer and is disposed between the latter and one of said electrodes,
   said dye comprising an organic material that (a) is strongly excited by the yellow-green radiation generated by said electroluminescent phosphor and emits yellow-red radiation, (b) is also excited by its own yellow-orange emission which it converts into orange-red radiation, and (c) reflects red radiation of the same hue as that which it emits and thereby efficiently transforms a preselected portion of the output of said electroluminescent phosphor to red radiation which blends with the other electroluminescent radiations and thus uniformly modifies the color of the light normally produced by said lamp.

6. The combination set forth in claim 5 wherein said impedance layer contains up to 70% by weight of $BaTiO_3$ that is uniformly dispersed in the plastic and provides a white-reflecting background for the radiations generated by said dye and electroluminescent phosphor.

7. In an electroluminescent lamp having a pair of spaced electrodes, means adapted to emit light when a voltage is applied across said electrodes comprising, in combination,
   a layer of plastic dielectric material selected from the group consisting of cyanoethylated cellulose and cyanoethylated polyvinyl alcohol,
   an electroluminescent phosphor dispersed in said layer of plastic material, and
   a daylight-fluorescent dye that comprises an integral solvated constituent of said plastic layer and is homogeneously distributed therein in intimate contact with the electroluminescent phosphor particles,
   said electroluminescent phosphor having an emission that peaks in the yellow-green region of the spectrum, and
   said dye having an absorption spectrum that peaks in the yellow-green and an emission spectrum that peaks in the yellow-orange and extends into the red and thus overlaps the yellow portion of the aforesaid absorption spectrum, whereby said dye reabsorbs a portion of its own emission and produces radiation in a preselected longer-wavelength region of the spectrum, and the color of said radiation and the light produced by said lamp is controlled by the amount of dye in the plastic dielectric layer.

References Cited by the Examiner

UNITED STATES PATENTS

| | | | |
|---|---|---|---|
| 2,834,903 | 5/1958 | Roberts | 313—108 |
| 3,018,402 | 1/1962 | Lewis | 313—108 |
| 3,052,810 | 9/1962 | Mash | 313—108 |
| 3,096,289 | 7/1963 | D'Ericco et al. | 313—108 X |
| 3,143,682 | 8/1964 | Clarke et al. | 313—108 |
| 3,152,994 | 10/1964 | Thornton et al. | |

GEORGE N. WESTBY, *Primary Examiner.*

R. L. JUDD, *Assistant Examiner.*